United States Patent [19]

Nicolin

[11] Patent Number: 4,504,179
[45] Date of Patent: Mar. 12, 1985

[54] CLAMPING SLEEVE FOR TOOLS OR WORKPIECES

[75] Inventor: Curt Nicolin, Grödinge, Sweden

[73] Assignee: Handelsbolaget Eminent, Sven Hultman & Co., Eskilstuna, Sweden

[21] Appl. No.: 387,036

[22] Filed: Jun. 10, 1982

[30] Foreign Application Priority Data

Jun. 11, 1981 [SE] Sweden .................................. 8103669

[51] Int. Cl.[3] ............................................. B23B 31/40
[52] U.S. Cl. ..................................... 409/234; 279/2 A; 279/4
[58] Field of Search ................. 279/1 D, 2 A, 2 R, 4, 279/8, 89, 90, 91; 409/234; 269/22, 48.1; 408/239 R

[56] References Cited

U.S. PATENT DOCUMENTS

| | | | |
|---|---|---|---|
| 1,448,987 | 4/1923 | Spalding et al. | 279/8 |
| 2,534,527 | 12/1950 | Myers | 279/4 |
| 3,507,507 | 4/1970 | Tobler et al. | 279/4 |
| 3,679,219 | 7/1972 | Cameron | 279/4 |
| 4,377,292 | 10/1983 | Staron | 408/239 R |

Primary Examiner—Z. R. Bilinsky
Assistant Examiner—Daniel W. Howell
Attorney, Agent, or Firm—Burns, Doane, Swecker & Mathis

[57] ABSTRACT

A clamping sleeve for tools or workpieces intended to be clamped with a truncated conical surface on a preferably cylindrical rotatable portion with a conical surface and to support the tool or workpiece with a substantially cylindrical surface concentric with the truncated conical surface and arranged to coact with a clamping ring. The clamping ring is arranged with threads to be screwed axially in both directions on the preferably rotatable portion. The clamping sleeve can be tightened by the clamping ring be against the conical surface with its truncated conical surface. The conical surface and the cylindrical surface consist of spaced mantles, which are sealingly combined with each other at the top end of the sleeve, forming a cavity open towards the base surface of the sleeve. Moreover, the thrust collar is axially movable at the base surface relative to the sleeve and provided with an axially directed collar, which is arranged to extend into an orifice of the cavity. The cavity is filled with a substantially incompressible medium. With continued turning of the thrust collar after tightening the sleeve against the conical surface, the thrust collar is pressed towards the base surface and consequently presses the collar inwards in the cavity. The medium is then set under an increasing pressure and will press the mantles by a radial force towards the conical surface and the surface of the tool or workpiece corresponding to the substantially cylindrical surface.

5 Claims, 4 Drawing Figures

U.S. Patent  Mar. 12, 1985  4,504,179
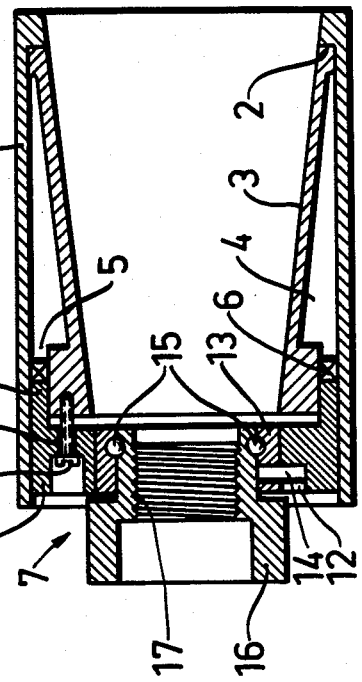
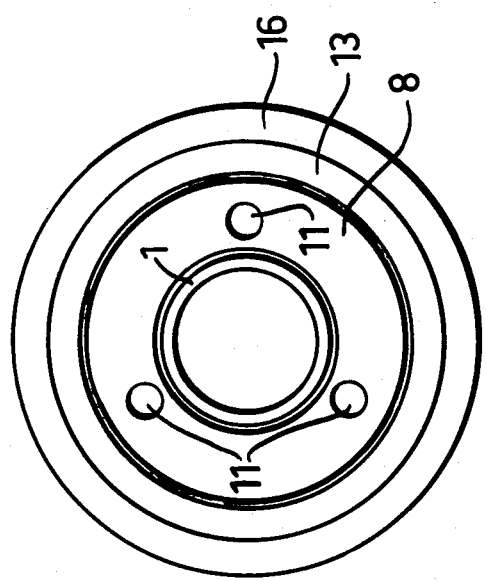
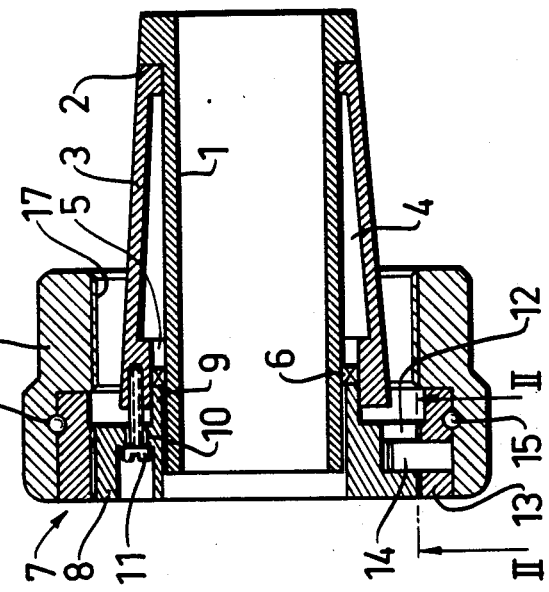
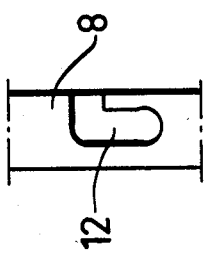

CLAMPING SLEEVE FOR TOOLS OR WORKPIECES

BACKGROUND AND SUMMARY OF THE PRESENT INVENTION

The present invention relates to clamping sleeves by means of which a tool or a workpiece with a cylindrical clamping surface can be clamped in a machine for driving the tool or workpiece. The clamping sleeve has a truncated conical surface, which is intended to be tightened against a corresponding conical surface of the machine, e.g. in a chuck or conical pin driven by the machine spindle.

Such previously known sleeves have usually the shape of a homogeneous body with a truncated conical outside and a substantially cylindrical hole or, depending on the use, instead a substantially cylindrical outside and a truncated conical hole. Moreover, the body is provided with a number of axial slits extending alternatingly from each end.

In use the sleeve with adapted tool or workpiece is tightened against the driven conical surface. However, in order that the gripping force about the tool and the workpiece, respectively, should be enough, it is necessary to press the clamping sleeve axially onto the conical surface by a nut which can be axially screwed onto the driven chuck or pin. The sleeve is clamped to the tool or workpiece by its "resilient properties" and its axial displacement along the conical surface and will lock the tool or workpiece to the chuck or pin.

The clamping ability of the sleeve is directly dependent on the frictional conditions existing between the sleeve and chuck-body in the axial and tangential direction. The lower the friction is, the greater the clamping force must be, but at the same time the joint will be less stable especially as it is subjected to vibrations.

The accuracy of the consecutive working of a slitted sleeve is dependent on the peripheral elongations to which it is exposed when tightened. As the frictional conditions vary, e.g. a slit containing a burr, varying lubrication, etc, unsymmetrical frictional conditions with varying elongations along the periphery will be the consequence, and the final result is a bad accuracy of consecutive working. There is also a risk that partial elongations will be so great that a permanent tension occurs with a consequent deteriorated accuracy of the relative sleeve.

Thus, this known sleeve has essential shortcomings, and so far it has not been possible to avoid these.

This essential and so far unsolved problem of the present sleeve of the type intended here is eliminated by the present invention. The influence of varying friction is reduced with the sleeve of the invention, the elongations take place radially and symmetrically due to the "hydrostatic paradox". The result will be a better clamping force and accuracy of consecutive working meaning an improved accuracy as well as clamping force and reduced wear.

BRIEF DESCRIPTION OF THE DRAWINGS

The present invention will be described in greater detail by way of examples and with reference to the drawing in which FIG. 1 is a longitudinal section of an embodiment of the sleeve according to the invention.

FIG. 2 is a partial view along the line II—II in FIG. 1.

FIG. 3 is an end view of the sleeve and

FIG. 4 is a longitudinal section of another embodiment of the sleeve according to the invention as seen in a longitudinal section.

DETAILED DESCRIPTION OF THE PREFERRED EMBODIMENTS

With reference to FIG. 1, a sleeve is intended to take up centrally a cylindrical portion of a tool, e.g. a drill shank, or a workpiece. A substantially cylindrical portion or mantle 1 is sealingly connected at 2 (e.g. by soldering or glueing) to a truncated conically shaped portion or mantle 3. The mantle 1 defines the substantially cylindrical surface which is to receive the tool or workpiece and the mantle 3 defines the truncated conical surface to be adapted in the conical portion, e.g. the chuck, of the machine. A cavity 4 is formed between the mantles 1, 3'. The cavity opens towards the base portion of the sleeve to the left in the figure. According to FIG. 1, the truncated conical mantle 3 has been made coarser in its free edge and the opening 5 has been given a form with cylindrical limiting surfaces. In the opening 5 there is arranged a sealing ring 6, which is axially movable. The cavity 4 is filled with a substantially incompressible medium, e.g. oil. At the base end of the sleeve portion a thrust collar 7 is arranged with a portion surrounding and controlled by the mantle 1.

The thrust collar 7 consists of a ring 8, which is guided by its cylindrical bore so that it is moveable on the cylindrical mantle 1. The ring 8 has a collar 9, which extends into the opening 5 between the mantles 1 and 3. The sealing ring 6 abuts on the collar 9. The ring 8 is further provided with a couple of bores 10, the number of which is three in the example shown (FIG. 3). Screws 11 screwed onto the coarse portion of the mantle 3 pass through these bores. The heads of these screws hold together the ring 8 with the mantles 1, 3 displaceably, the collar 9 being tightened against the sealing ring 6. The ring 8 has moreover three angular bayonet grooves 12 (one shown in FIG. 1) opens to an inner ring 13 movable relative to the ring 8. The inner ring 13 is in its turn provided with three pins 14 corresponding to the grooves.

The inner ring 13 supports a nut body 16 with threads 17 rotatably via bearing balls 15.

Thus, the inner ring 13 and the nut body 16 form a unit, which can be connected with the ring 8 releasably by the pins 14 and the bayonet grooves 12.

For the sake of clarification the use of the sleeve will be explained with reference to the embodiment shown in FIGS. 1–3. The inner ring 13 with the nut body 16 is moved with the pins 14 axially into the grooves 12 of the ring 8 and is turned clockwise so that the pins touch the bottoms of the grooves and consequently secure the bayonet joint. For example, a tool shaft is introduced into the central, cylindrical hole of the sleeve. The hole is formed by the mantle 1, and the sleeve is applied with tool in the cone of e.g. a drill chuck.

The nut body 16 is now threaded onto the threads of the chuck and brings via the pins 14 and the grooves 12 the remaining part of the sleeve, the truncated conical surface of which will engage the cone of the chuck in this way. As the nut body 16 is freely rotatable on the inner ring 13 it is possible, in spite of the fact that the sleeve is retained nonrotatably by the chuck, to turn the nut body and to thread this further onto the threads 17 so that the collar and the sealing ring 6 are pressed inwardly into the opening between the mantles 1 and 3. The pressure of the incompressible medium in the cavity 4 will then be increased. The medium will then actuate the mantles with radially directed component forces. This means that the tool shaft is clamped in the sleeve due to the outward bending of the mantle 1 and that this due to the outward bending of the mantle 3 is clamped in its turn in the cone of the chuck without any relative movement taking place between the tapered surface of the chuck and the mantle 3.

The nut body 16 and its associated inner ring 13 can of course be received in the threads of the chuck from the beginning and the remaining part of the sleeve is moved by means of a suitably inserted tool up through the central holes of the inner ring so that the pins 14 are moved up into the grooves 12. By turning the nut body in order to thread this onto the chuck, the pins 14 will be automatically moved into the bottom of the relative groove 12. On this way the remaining part of the sleeve is prevented from falling out of the nut body. A continued turning of the nut body will have the same result as described above.

By the device described above and its action a quite new sleeve not previously known is obtained which is not subjected to any considerable wear in comparison with a conventional sleeve.

FIG. 4 shows a sleeve according to the invention by which e.g. a workpiece with a cylindrical hole is to be clamped to a driven conical pin. This sleeve has parts corresponding to the previously described sleeve but the substantially cylindrical surface is formed by the outer mantle 1 and the truncated conical surface by the inner mantle 3. Moreover, the nut body 16 is placed innermost radially and the ring 8 provided with a collar outermost radially. As the parts of the two embodiments shown substantially agree, they have been provided with the same reference numerals. A workpiece is e.g. clamped with the device shown in FIG. 4 in a way corresponding to that previously described in connection with FIGS. 1-3.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A clamping sleeve, adapted for use with a spindle, for tools or workpieces to be clamped by said sleeve and provided with a truncated conical surface for engagement with a rotatable driving portion of the spindle having a conical surface, the clamping sleeve supporting the tool or workpiece with a substantially cylindrical surface concentric with the truncated conical surface, a thrust collar provided on said sleeve with threads so as to be screwed axially in both directions on cooperating threads provided on the rotatable driving portion and concentrically with the axis of the conical surface, the clamping sleeve being tightened by the thrust collar, wherein the truncated conical surface and the cylindrical surface comprises spaced mantles which sealingly attach to each other at a top end of the sleeve, said mantles forming a cavity filled with a substantially incompressible medium, a base surface defined by said sleeve, the cavity opening towards said base surface, the thrust collar arranged at the base surface and axially movable relative to the sleeve and provided with an axially directed collar, an orifice defined in the cavity between the mantles and the collar extending into the orifice, at least one screw extending axially through bores defined in the thrust collar and screwed onto the end of one of the mantles for securing the thrust collar in a position relative to the collar so that axial displacement of the thrust collar is permitted, the thrust collar pressed towards the base surface upon continued turning of the thrust collar after the sleeve is tightened against the conical surface and the collar is pressed inwards in the cavity, so as to subject the medium to an increasing pressure and press the mantles towards the conical surface and the surface of the tool or workpiece corresponding to the substantially cylindrical surface.

2. The clamping sleeve as claimed in claim 1, wherein the opening of the cavity is sealed by an axially displaceable sealing ring, the collar of the thrust collar acting against the sealing ring.

3. The clamping sleeve as claimed in claim 1 or 2, wherein the substantially cylindrical surface forms an outside of the clamping sleeve.

4. The clamping sleeve as claimed in claim 1 or 2, wherein the truncated conical surface forms an outside of the clamping sleeve.

5. The clamping sleeve as claimed in claim 1, wherein the thrust collar includes a nut body supporting threads, an inner ring rotatable concentrically with the nut body but axially fixed therewith, said inner ring being provided with radially directed pins, a ring arranged concentrically with the inner ring, said ring having bores and supporting the collar and being provided with bayonet grooves coacting with the pins, said grooves and pins releasably securing the inner ring and the nut body with the remaining portion of the clamping sleeve.

* * * * *